Nov. 10, 1936.  R. T. JOHNSTON  2,060,084
COATED WOOD MATERIAL
Filed March 4, 1932

INVENTOR.
Robert T. Johnston
BY
ATTORNEY.

Patented Nov. 10, 1936

2,060,084

UNITED STATES PATENT OFFICE 2,060,084

COATED WOOD MATERIAL

Robert T. Johnston, Plainfield, N. J., assignor to Bakelite Corporation, New York, N. Y., a corporation of Delaware Application March 4, 1932, Serial No. 596,715

14 Claims. (Cl. 91—70)

This invention relates to roofing or siding materials of wood and intended for exposure to all kinds of weather and the extremes of summer and winter temperatures. While other types of materials such as cement and asphalt-impregnated fibrous base materials have been proposed to take the place of wooden shingles and the like, by far the greatest proportion of roofs and sidings are of wood.

Wood without some protective coating rapidly deteriorates upon exposure, and in addition its growing scarcity as well as increased cost point to the necessity of protection. Cost considerations have dictated types of coatings such as asphalt and oil stains. Asphalt, however, softens and flows in summer, and on the other hand it becomes porous and brittle in winter so that it affords little protection against moisture penetration; the constant expansion and contraction that follows from absorption and evaporation of moisture gradually disintegrates the surface fibers with a resulting disappearance of the coating and the formation of splits in the shingles. Oil stains and the like leach out after a brief time, requiring frequent renewal, but even with renewal, checks and shrinkages occur thus permitting leaks. And modifications of oils by the inclusion of pigments and other mechanical extending agents to form paints and the like do not materially assist the retention of the oils since the roughness and porosity of the surface tend to cause a separation leaving the fillers largely as powders which soon disappear. Materials of this nature, therefore, have not met the existing demand for protective shingle coatings.

In accordance with the present invention the foregoing objections relative to wooden shingles are overcome to a marked degree, and their life and original appearance are greatly prolonged. It provides wood shingles with protective airdried coatings that have the characteristics of requisite flexibility and toughness to withstand exposure to weather and temperature changes as well as possessing to a surprising extent the properties of inertness with respect to oxidation, resistance to acids occurring in the atmosphere and practical infusibility under the action of the sun's heat. The compositions used for coatings as herein described are furthermore homogeneous in that upon application to rough and porous wood shingle surfaces, no separation into components is found to occur but instead adherent films of uniform continuity remain to give coatings resistant to penetration by moisture and other agents. Moreover, these compositions can be extended by the inclusion of pigments or other coloring matter or agents without material modification of the film properties; and/or surfacings of granular materials such as sand, crushed quartz or slate, glass, etc., can be applied, the coating compositions in this case acting as cements for bonding the granules to the base.

Coating or protective compositions for the purposes of this invention comprise in general oil compositions modified by the inclusion of synthetic resins of the phenolic type which are suspensible in or miscible with the oils. Preferably the phenolic resins are those which in themselves possess the property of solubility or miscibility with oils without necessitating the addition of any solubilizing agent such as rosin. It is found that but small amounts of such oil-soluble resin profoundly modify the oil characteristics with respect to resistance to progressive oxidation and to acids and alkalies out of all proportion to the resin content. Shingles so coated are thereby brought into a competitive price range with hitherto-known coated shingles but with the highly important advantages thereover of increased life, durability and appearance.

In a preferred form of the invention, saturants of a character hereinafter indicated are in addition applied prior to the protective compositions so that shingles are penetrated by them to fill the pores as well as to bind surface fibers together and seal any checks or splits. An effect equivalent to that of case hardening is obtained as a consequence of this treatment. As an additional result the cover or protective coat necessary for a required area is thereby materially reduced in quantity, while the life and usefulness of the shingles is increased.

Phenolic resins of the oil soluble type herein referred to, that is, resins which are suspensible or miscible with oils, are in general obtained by reacting a phenol having a phenyl or aliphatic chain substituent with a methylene-containing agent such as formaldehyde or its polymers or compounds, furfural, benzaldehyde, etc., and a suitable catalyst. Some resins or resinoids from phenols that in themselves are not miscible with oils can be made suspensible in oils by blending them with sufficient proportions of rosin, ester gum, or other natural resins to give improved oil compositions; but such additions diminish the desirable properties of the phenolic resins in proportion to the amount included and for that reason are undesirable. Oil soluble or suspensible resins can, however, be obtained from the lower phenols without the necessity of adding rosin or the like by including an oil such as tung oil as a reactive ingredient of the resin and preferably by reacting the oil first with the phenol and then with the aldehyde or other methylene-containing agent. The higher phenols, such as phenyl-substituted phenols which form resins that in themselves are miscible or suspensible in oils exhibit in a striking manner the properties heretofore mentioned. Accordingly these resins constitute the preferred form of phenolic resins for association with oils. If desired, the resins or compositions may be modified by the addition of high boiling solvents such as dibutyl phthalate, tricresyl phosphate, aniline, etc.

The oils found most suitable for use in the cover or protective layer or film on the exposed surface of the shingle are the drying oils, particularly tung, linseed, rapeseed, etc. Semi-drying oils as soya-bean or non-drying oils like castor oil may be included or substituted in part; or oils including fatty acids such as oleic, stearic, palmitic, or the fatty acids themselves can be substituted. For use in the saturant or impregnating layer semidrying or non-drying oils or mixtures of them with drying oils are considered most suitable. These oils when mixed with resins as described form mixtures which are soluble in some of the usual volatile solvents such as alcohol, mineral spirits, turpentine, etc. Any desired color can be given the coating or bonding layers by suitable pigments which when added to resins as here described are found not to become lifeless but to substantially retain their color quality due to the protecting influence of the resins.

For the purpose of illustrating the invention, roofings using coated wood base shingles are shown in the accompanying drawing, it being understood that the invention may be applied to other forms of building materials such as siding planks included under the terms "roofing" or "shingle".

The wooden shingle body 2 in the preferred procedure is first treated with a fluid saturant. This saturant can be made by cooking an oil-soluble phenolic resin together with a mixture of a drying oil such as tung oil, linseed oil, etc. and a semi-drying oil as soya-bean or a non-drying oil as castor oil. It is desirable to have a relatively large proportion of resin in the saturant on account of the improved characteristics imparted to the shingle in resistance to deterioration; on the other hand fluidity promotes penetration, and the inclusion of semi-drying or non-drying oils, such as soya-bean or castor oil, are found effective for this purpose. Suitable proportions are from about twelve to twenty-five gallons of an oil mixture as described to each one hundred pounds of resin; the proportions can be varied within wide limits, and the semi-drying or non-drying oils can be omitted. Fluidity, for instance, can be otherwise secured by the use of resins prepared from crude tar acids through reacting them with a quantity of formaldehyde or other methylene-containing agent insufficient to completely resinify the phenolic bodies present, thus retaining unreacted phenols as wood preservatives against destructive organisms; when resins of the oil-soluble type are formed, oils as described above can be added to modify the consistency and drying and other properties of these compositions. Additional ingredients such as stearine pitch or asphalt or both can be included in the saturants and they can be further modified by natural resins, gums, etc. to lower costs. Pigments or other loading materials may be omitted to increase penetration. Other saturants than those here described may be added or substituted.

Figure 1:
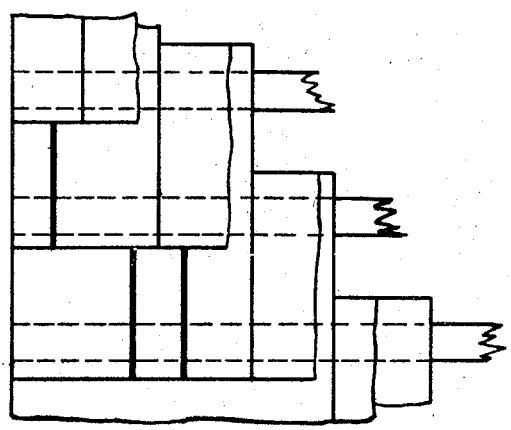
Fig. 1 is a plan view of a roof or the side view of the side of a building.
Figure 2:
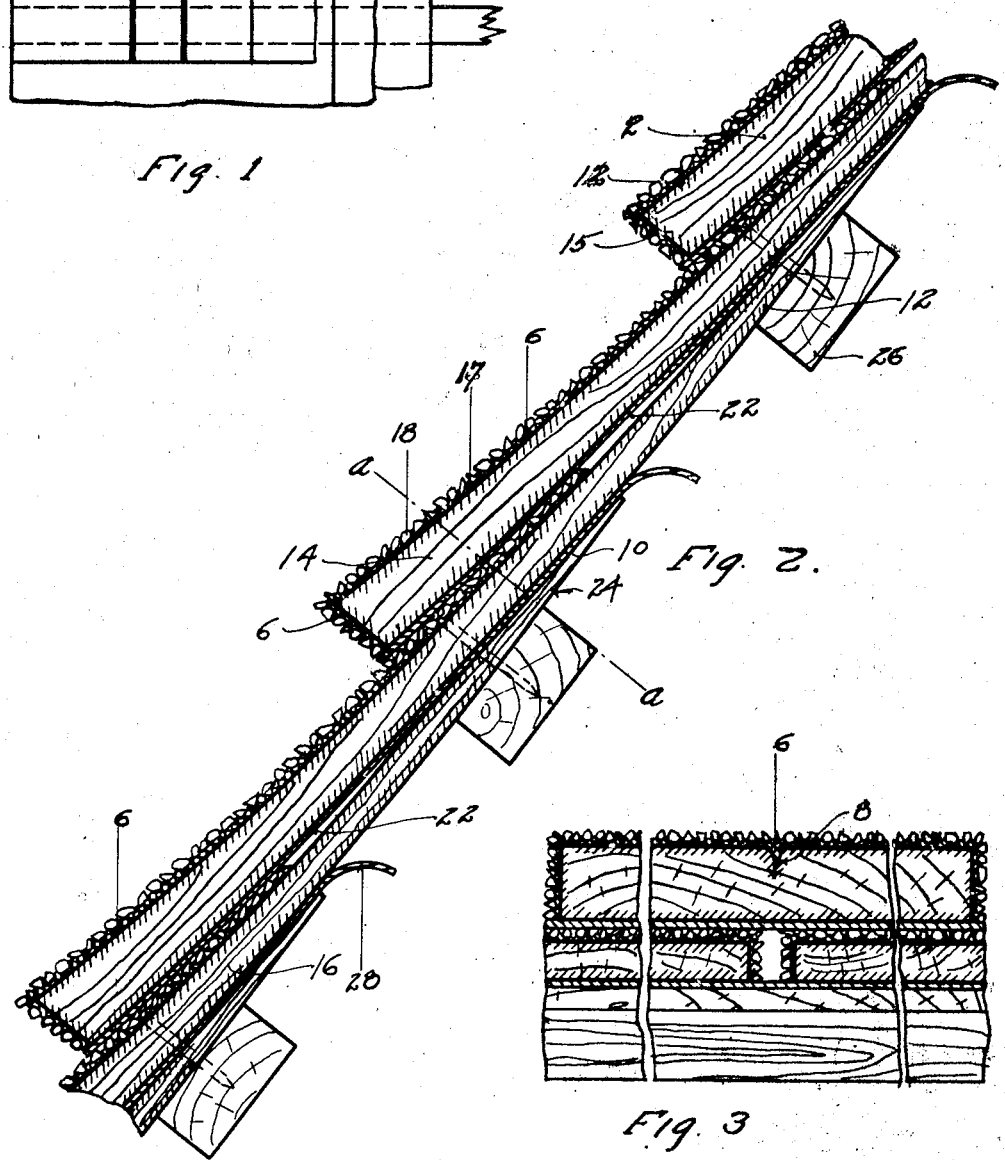
Fig. 2 is a section on an enlarged scale.
Figure 3:
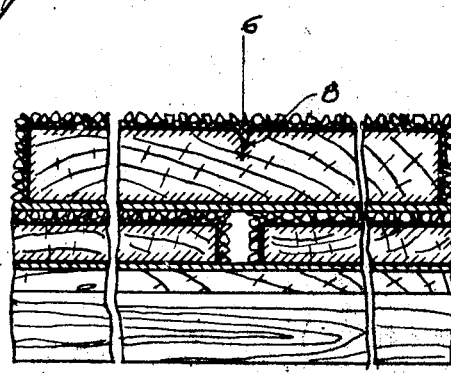
Fig. 3 is a section on line a—a of Fig. 2.

The saturant is preferably proportioned and treated by heating or other means so that it is a liquid at about 200° C. and after penetration it fills the surface of the shingle but hardens upon cooling. Penetration can be secured or intensified by other means such as the inclusion of solvents to modify its viscosity; wood having a close grain usually requires a thinner impregnating medium than open grain wood. The impregnating layer 12 (Fig. 2) may cover the entire shingle body or only the surfaces of the exposed portion; but it preferably extends past the exposed portion well up on to the upper surface 14 overlapped by the next upper roofing shingle 14 to a point beyond the butt 15 of a second shingle course, and on the lower surface beyond the end 10 or the next lower shingle 16. Likewise the side edges and butt ends are impregnated to completely encase the exposed portions. If there are any checks 8 in the shingle, the saturant penetrates the sides of the openings, and with checks of normal size it fills the openings and cements together the sides of the check to prevent splitting. If the check is quite large, the impregnating material forms a keying medium in the sides of the check when thereafter filled with a superposed resinous coating.

The impregnating agent may be applied in any suitable manner such, for example, as heating the shingle to expand and drive out of the shingle body any moisture and air and then immersing or spraying the shingle with the impregnating agent; upon cooling the liquid impregnating agent is drawn below the surface of the shingle into the shingle body. After the volatile ingredients evaporate, there remains the continuous layer of impregnant.

A protective layer or film 6 is applied over the impregnating layer or coating, preferably to extend past the nailing line which is well under the butt of a superposed shingle; it is also applied to the butt and side edges, but it can be omitted from the bottom face of the shingle, since the impregnating layer is sufficient protection for this portion of the body. The protecting layer can be of the type heretofore described, for example it can be a synthetic resin obtained by reacting a phenyl-substituted phenol with an aldehyde and thereafter digested with tung oil, or tung oil and linseed oil; from 12 to 40 and preferably 30 to 35 gallons of oil to 100 pounds of resin give satisfactory proportions though these may be widely varied, the viscosity being controlled by the cooking period. For application, the composition may be dissolved in a suitable volatile solvent but it is preferably more viscous than the saturant, so that there is formed a relatively thick coat which remains in position on the shingle body, does not run off when applied, dries rapidly and is quickly in a condition to receive granules 18, when they are used. The solvent in the composition acts to somewhat soften the saturating layer and thereby form a substantial bond between the latter and the composition.

If the shingle is to be colored the color materials are added to the protective layer; any suitable coloring materials preferably pigments, may be used. Since the colors are embedded in the weather resistant coating they are protected and consequently are substantially unaffected by the weather.

The protective layer can be applied in various ways. For instance, the shingle can be dipped in the liquid material if all surfaces are to be coated; or the material can be sprayed onto the upper surface, sides and butt edges leaving the under surface protected by the impregnating layer alone.

The shingle can be used with the protective film as the exposed surface but preferably a surfacing material of relatively small particles or granules 18 of silica sand, quartz sand, or other mineral substances such as powdered or crushed glass are embedded in or applied to the resin. These are incorporated before the protective film has hardened, or before all of the solvent has evaporated, either by driving them into the resin as by a blast of air or by spreading them by gravity or other means on the shingle and rolling the granules into the coating layer; both methods may be combined. Sufficient amount of the granules is preferably used to completely cover the bonding agent. Some of the granules can be forced completely into the bonding agent so that they are covered and firmly bonded by it when it hardens. A particularly desirable arrangement is the use of crushed glass for the exposed layer of partially embedded granules, and another layer 17 of any type of granules beneath, such as sand or crushed quartz, since glass filters out the ultra-violet rays and thereby affords protection against them while the embedded layer affords additional protection to as well as extending the coating composition. The outer granules need not be entirely coated with the bonding agent but only partially embedded therein; with uncoated granules projecting above the surface of the bonding agent there is no tendency for the shingles to stick together even though one is stacked on top of another as they come from the machine and before the bonding agent is dry. This is highly desirable from a manufacturing point of view as it eliminates the necessity of waiting for the bonding agent to dry before the shingles are stacked or bundled.

Different color effects may be obtained if desired, by forming rows or other designs with different colored resins or with translucent, transparent or colored sand or glass particles. Granules which are previously coated or colored may easily be produced by thoroughly mixing the granules with weather resistant compositions of the previously described type. Enough granules can be so mixed to form a plastic mass which is then rolled relatively thin and hardened, after which it is crushed and screened to obtain granules of the desired size. If glass granules are used they may be colored in any way that colored glass is made or they may be color-coated as described above.

When shingles are laid over each other, there may be spaces between the upper and lower shingles through which water may be driven inward from the shingle butts. In order to prevent this, a sheathing 22, can be laid between upper and lower shingle courses. This sheathing may be of any suitable material such as asphalt impregnated asbestos or paper or felt preferably treated to be fire resistant. Its nature should be such that it is yieldable and relatively much softer than the protective layer 6 which coats the shingle bodies so that it can and will conform itself to the shape of the shingles. The combination of such a yieldable sheathing with a shingle having a hard coating presenting a rough surface of the type formed by projecting granules, makes a particularly tight and weather resistant roof. The fine granules projecting from the surface of the protective layer extend into the yieldable surface of the sheathing, to act as barriers and to prevent moisture working inward between the shingle courses. The sheathing preferably is wide enough to extend from the butt end of the shingles in an upper course 14 past the inner or overlapped end of the shingles in the lower course 16, thus giving the maximum amount of protection while avoiding exposure of the sheathing to mar the appearance. Any water which may work toward the center of the shingle where the shingle is uncoated, for instance at 24, quickly dries out when the shingles are mounted on furring strips 26 to expose them to the warmth and dryness of the interior of the house. When sheathing of a fireproof nature is used overhanging ends 28 are desirable to act as curtains against the spread of fire. In case the sheathing is combustible in the usual sense, that is it burns readily, the overhanging ends 28 are omitted.

Although the previous description has dealt specifically with the application of a coating to a wood shingle, it is obvious that the invention may be applied to other articles for instance siding strips. Moreover the usual colored shingles of wood are very costly, the colors do not last, and the shingles have a poor appearance although the colors may be brilliant just under the surface. With colored resinous coatings as here described, however, the colors are only in the exposed protective layer and/or the granules where they are needed, and they are protected from the weather and the active rays of the sun by the binder and by the granular material when so surfaced. It is therefore recognized that these and various other modifications and applications may be made and it is to be understood accordingly that the invention is to be construed as broadly as the claims, taken in conjunction with the prior art, may allow.

I claim:

1. Wood base roofing element having as a protective coating an oil composition including a phenolic condensation resin miscible with the oil, said composition as applied having the property of air drying to a substantially insoluble film resistant to oxidation without baking.

2. Coated wood base roofing element comprising a wood base, a saturant including a phenolic resin applied to the base, and a protective coating therefor of an oil composition including a phenolic resin miscible with the oil and integrally bonded with the saturant.

3. Coated wood base material for exposure to weather comprising a wood base, a saturant including a phenolic resin applied to the base, a protective coating therefor bonded with the saturant and of an oil composition including a phenolic resin miscible with the oil, and a granular surfacing substance for the protective coating.

4. Coated wood base material for exposure to weather comprising a wood base, a weather resistant protective coating therefor of an air drying oil resin composition, and a granular surfacing substance for the protective coating.

5. Coated wood base material for exposure to weather comprising a wood base, a weather resistant protective coating therefor of an air drying resinous drying oil composition, and a granular surfacing substance for the protective coating.

6. Coated wood base material for exposure to weather comprising a wood base, a saturant for said base, and a protective coating for the saturant integrally bonded thereto, said saturant comprising a phenolic resin in admixture with a drying and a semi-drying oil.

7. Coated wood base material for exposure to weather comprising a wood base, a protective resinous coating for the base, and a surfacing material held by the coating comprising an under layer of granular material substantially embedded in the coating, and an exposed upper layer of granules substantially impervious to ultra violet rays, said resinous coating being non-melting by exposure to the sun.

8. In a method of making a siding or roof assembly, a process of preparing wood base materials suitable for exposure to weather which comprises heating a wood base, applying a phenolic resin composition thereto while hot, and thereafter cooling, and coating with an oil composition drying in air to form a film and bonding with said phenolic composition while softening the surface of the composition.

9. In a method of making a siding or roof assembly, a process of preparing wood base materials suitable for exposure to weather which comprises impregnating a wood base with a phenolic resin composition, and while the surface of the resinous composition is soft, coating the impregnated base with an oil composition bonding with the resin composition.

10. In a method of making a siding or roof assembly, a process of preparing wood base materials suitable for exposure to weather which comprises impregnating a wood base with a phenolic resin composition, coating the impregnated base with an oil composition bonding to the resin composition, and applying a surfacing of granules to the coating.

11. A wooden shingle comprising a formed wood base, a synthetic resinous film of waterproof and non-softening character coating a portion of said base and resulting from an air hardening oil-resin composition, and granular material superimposed on and held by said film.

12. A wooden shingle comprising a formed wood base, a colored waterproof and non-softening film of synthetic resinous material coating said base and resulting from an air hardening oil-resin composition, and granular material through which the color of the film will show superimposed on and held by said film.

13. Coated wood base material for exposure to weather comprising a wood base, a saturant including a phenolic resin and a wood preservative applied to the base, and a protective coating therefor of an oil composition including a phenolic resin miscible with the oil and bonded with the saturant.

14. Coated wood base material for exposure to weather comprising a wood base, a saturant including a phenolic resin and other phenolic bodies acting as a wood preservative applied to the base, and a protective coating therefor of an oil composition including a phenolic resin miscible with the oil and bonded with the saturant.

ROBERT T. JOHNSTON.